(12) United States Patent
Hann

(10) Patent No.: US 10,499,126 B2
(45) Date of Patent: Dec. 3, 2019

(54) NETWORK ELEMENT FOR DISTRIBUTING TIMING INFORMATION

(71) Applicant: ADVA Optical Networking SE, Martinsried/Munich (DE)

(72) Inventor: Kenneth Hann, Espoo (FI)

(73) Assignee: ADVA OPTICAL NETWORKING SE, Martinsried/Munich (DE)

( * ) Notice: Subject to any disclaimer, the term of this patent is extended or adjusted under 35 U.S.C. 154(b) by 50 days.

(21) Appl. No.: 15/869,456

(22) Filed: Jan. 12, 2018

(65) Prior Publication Data

US 2018/0220211 A1    Aug. 2, 2018

(30) Foreign Application Priority Data

Feb. 2, 2017    (EP) .................................... 17154286

(51) Int. Cl.
*H04Q 11/04*    (2006.01)
*H04J 3/06*    (2006.01)
(Continued)

(52) U.S. Cl.
CPC ........ *H04Q 11/0421* (2013.01); *H04J 3/0688* (2013.01); *H04L 29/06* (2013.01);
(Continued)

(58) Field of Classification Search
None
See application file for complete search history.

(56) References Cited

U.S. PATENT DOCUMENTS

| 7,031,266 B1 * | 4/2006 | Patel | ................. | H04L 45/02 370/254 |
| 8,089,400 B1 * | 1/2012 | Fang | ................. | G01S 19/05 342/357.42 |

(Continued)

OTHER PUBLICATIONS

Droms Bucknell University R: "Dynamic Host Configuration Protocol; rfc2131.txt", Dynamic Host Configuration Protocol; rfc2131.txt Internet Engineering Task Force, IETF; Standard, Internet Society (ISOC) 4, Rue Des Falaises CH-1205 Geneva, Switzerland, Mar. 1, 1997 (Mar. 1, 1997), XP015007915.

(Continued)

*Primary Examiner* — Kevin D Mew
(74) *Attorney, Agent, or Firm* — Young & Thompson

(57) ABSTRACT

A network element is provided that includes a signal interface for receiving satellite signals transmitted by a satellite system and a processing system for producing the timing information based on the satellite signals and on assistance information received from a data transfer network. The network element transmits the timing information to the data transfer network in accordance with a timing transfer protocol. At a start-up, the network element requests a dynamic host configuration protocol server to send host configuration data containing a protocol address to be associated with the network element. The network element reads, from the host configuration data, information enabling the network element to get aware of the assistance information and obtains the assistance information in accordance with the read information. Thus, the dynamic host configuration protocol server enables the network element to operate as a network-assisted source of satellite-based timing.

20 Claims, 4 Drawing Sheets

(51) Int. Cl.
H04L 12/24 (2006.01)
H04L 29/06 (2006.01)
H04L 29/08 (2006.01)

(52) U.S. Cl.
CPC .......... *H04L 41/0803* (2013.01); *H04L 41/12* (2013.01); *H04L 67/1095* (2013.01)

(56) References Cited

U.S. PATENT DOCUMENTS

| | | | |
|---|---|---|---|
| 8,781,442 B1* | 7/2014 | Link, II | G08G 1/205 455/411 |
| 2006/0036365 A1* | 2/2006 | Chiayee | G01S 19/05 701/469 |
| 2007/0060097 A1* | 3/2007 | Edge | H04L 29/06027 455/404.1 |
| 2007/0096981 A1* | 5/2007 | Abraham | G01S 19/05 342/357.42 |
| 2007/0298761 A1* | 12/2007 | Bani Hani | G01S 5/145 455/404.2 |
| 2011/0136500 A1* | 6/2011 | Sung | G01S 5/0036 455/456.1 |
| 2014/0080517 A1* | 3/2014 | Martinez Olano | H04L 61/1541 455/456.2 |
| 2014/0162589 A1* | 6/2014 | Gupta | H04W 4/90 455/404.2 |
| 2015/0309178 A1* | 10/2015 | Syrjarinne | G01S 19/06 342/357.43 |
| 2015/0382272 A1* | 12/2015 | Carichner | H04W 88/10 370/338 |
| 2016/0320491 A1* | 11/2016 | Perdue | G01S 19/11 |

OTHER PUBLICATIONS

Alexander Lachman Technology Set AL: "DHCP Options and BOOTP Vendor Extensions; rfc1533.txt" DHCP Options and BOOTP Vendor Extensions; rfc1533.txt, Internet Engineering Task Force IETF Standard Internet Society (ISOC) 4, Rue Des Falaises CH-1205 Geneva, Switzerland, Oct. 1, 1993 (Oct. 1, 1993), XP015007320.

Polk M Linsner et al.: "Dynamic Host Configuration Protocol Options for Coordinate-Based Location Configuration Information; rfc6225.txt", Dynamic Host Configuration Protocol Options for Coordinate-Based Location Configuration Information; rfc6225.txt, Internet Engineering Task Force, IETF; Standard, Internet Society (ISOC) 4, Rue Des Falaises CH-1205 Geneva, Switzerland, Jul. 29, 2011 (Jul. 29, 2011), pp. 1-36, XP015081249,[retrieved on Jul. 29, 2011].

Anonymous: "Assisted Partial Timing Support", Jun. 1, 2014 (Jun. 1, 2014), pp. 1-6, XP055396014, Retrieved from the Internet: URL:http://www.advaoptical.com/-/media/Resources/ApplicationNotes/ Assisted Partial Timing Support.ashx [retrieved on Aug. 3, 2017] e.g. p. 3.

Fabini J et al.: "Location-based assisted handover for the IP Multimedia Subsystem", Computer Communications, Elsevier Science Publishers BV, Amsterdam, NL, vol. 31, No. 10, Jun. 25, 2008 (Jun. 25, 2008), pp. 2367-2380, XP022700488, ISSN: 0140-3664, DOI: 10.1016/J.COMCOM.2008.02.021 [retrieved on Feb. 29, 2008] sections 2.2, 2.3.5, 2.3.6.

EP Search Report, dated Aug. 4, 2017, from corresponding EP 17 15 4286 application.

* cited by examiner

NETWORK ELEMENT FOR DISTRIBUTING TIMING INFORMATION

FIELD OF THE DISCLOSURE

The disclosure relates to a network element capable of operating as a timing source on the basis of one or more satellite signals received from a satellite system and assistance information received from a data transfer network. The disclosure relates also to a dynamic host configuration protocol "DHCP" server for enabling a network element to operate as a timing source of the kind mentioned above. The disclosure relates also to a method for configuring a network element to operate as a timing source of the kind mentioned above. The disclosure relates also to a computer program for configuring a network element to operate as a timing source of the kind mentioned above.

BACKGROUND

In many data transfer networks, there is a need to produce timing information and/or position information based on one or more satellite signals received from a satellite system. The satellite system can be a Global Navigation Satellite System "GNSS" that can be for example the US Global Positioning System "GPS", the Russian GLONASS, the European Galileo system, or the Chinese Beidou system. When a device for producing the timing and/or position information starts up, the device needs sufficiently strong satellite signals from a sufficient number of satellites and/or assistance information which aids the device to start up with weaker satellite signals from a smaller number of satellites. The assistance information may comprise for example Assisted-GPS "A-GPS" data such as almanac data indicative of the status of the satellite constellation of the satellite system and/or ephemeris data indicative of orbital information related to one or more satellites of the satellite system. Furthermore, the assistance information may comprise position data which expresses the geographical position of the device during the start-up.

When the above-mentioned assistance information is not available, a typical requirement is to have an outdoor GNSS-antenna with a clear sky view so as to receive sufficiently strong satellite signals from a sufficient number of GNSS-satellites. A receiving GNSS-device may need many minutes to receive required data from the GNSS-satellites so as to resolve a correct location of the GNSS-device. A receiving GNSS-device adapted to produce timing information will also carry out position determination in which the GNSS-device uses at least four satellites to average the position of the device over a number of hours, usually over 24 hours, to achieve a position fix. If the GNSS-antenna is in an urban canyon or otherwise incapable of receiving sufficiently strong satellite signals from a sufficient number of satellites, the accuracy of the position fix is limited and this will show an error in the timing information. Therefore, in many cases, it is important to arrange the assistance information, e.g. the A-GPS data, to be available to the receiving GNSS-device.

The above-mentioned A-GPS data is maintained in an A-GPS server from which a GNSS-device of the kind mentioned above can retrieve the A-GPS data by using A-GPS protocols for transferring the A-GPS data. The A-GPS protocols constitute a part of a Positioning Protocol defined by two different standardization bodies: the $3^{rd}$ Generation Partnership Project "3GPP" and the Open Mobile Alliance "OMA". A typical approach to enable a GNSS-device to run the A-GPS protocols is to provide the GNSS-device with a dedicated A-GPS chip that comprises means for running the A-GPS protocols. Providing a GNSS-device with an A-GPS chip for running the A-GPS protocols would increase the complexity and the costs of the GNSS-device. The cost impact can be significant especially if a data transfer network comprises a number of GNSS-devices and each of these GNSS-devices needs to be provided with an A-GPS chip.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention there is provided a new network element capable of operating as a timing source on the basis of one or more satellite signals received from a satellite system and assistance information received from a data transfer network. The satellite system is a Global Navigation Satellite System "GNSS" that can be for example the US Global Positioning System "GPS", the Russian GLONASS, the European Galileo system, or the Chinese Beidou system. The assistance information is based on the Assisted-GPS "A-GPS" data and the assistance information may comprise for example at least a part of the A-GPS data such as almanac data indicative of the status of the satellite constellation of the satellite system and/or ephemeris data indicative of orbital information related to one or more satellites of the satellite system. Furthermore, the assistance information may comprise position data which expresses the geographical position of an antenna for receiving the one or more satellite signals.

A network element according to the invention comprises a data interface for connecting to a data transfer network, a signal interface for receiving one or more satellite signals transmitted by a satellite system, and a processing system adapted to:
control the network element to request a dynamic host configuration protocol "DHCP" server of the data transfer network to send host configuration data containing a protocol address, e.g. an Internet Protocol "IP" address, to be associated with the network element,
read, from the above-mentioned host configuration data, information enabling the network element to get aware of assistance information assisting the network element to produce timing information based on the one or more satellite signals,
obtain the assistance information in accordance with the information read from the host configuration data,
produce the timing information based on the one or more satellite signals and on the assistance information, and
control the network element to transmit the timing information to the data transfer network in accordance with a timing transfer protocol used in the data transfer network.

The information read from the host configuration data enables the network element to get aware of the assistance information, and therefore the network element can start the production of the timing information also in weak and restricted satellite signal environments. Thus, there is no need to provide the network element with an A-GPS chip or similar.

In cases where the host configuration data comprises position data expressing the geographical position of the antenna receiving the satellite signals and the received satellite signals happen to be sufficiently strong and transmitted by a sufficient number of satellites for enabling a position fix based on the satellite signals, a check can be made between the position data and the position fix based on the satellite signals. This functionality can be used for example to add robustness against jamming and spoofing.

In accordance with the invention there is provided also a new dynamic host configuration protocol "DHCP" server for enabling a network element to operate as a timing source of the kind described above.

A DHCP-server according to the invention comprises a data interface for connecting to a data transfer network and a processing system adapted to:
  allocate, in response to receiving a request from a network element of the data transfer network, a protocol address to be associated with the network element,
  providing host configuration data with the allocated protocol address and with information enabling the network element to get aware of assistance information assisting the network element to produce timing information based on one or more satellite signals transmitted by a satellite system, and
  control the DHCP-server to transmit the host configuration data to the network element.

In accordance with the invention there is provided also a new method for configuring a network element to operate as a timing source of the kind described above. A method according to the invention comprises:
  receiving, from a dynamic host configuration protocol "DHCP" server, host configuration data containing a protocol address to be associated with the network element,
  configuring the network element to communicate with a data transfer network in accordance with the host configuration data,
  reading, from the host configuration data, information enabling the network element to get aware of assistance information assisting the network element to produce timing information based on one or more satellite signals transmitted by one or more satellites of a satellite system, and
  obtaining the assistance information in accordance with the information read from the host configuration data.

In accordance with the invention, there is provided also a new computer program for configuring a network element to operate as a timing source of the kind described above. A computer program according to the invention comprises computer executable instructions for controlling a programmable processing system of the network element to:
  configure the network element to communicate with a data transfer network in accordance with host configuration data received from a dynamic host configuration protocol "DHCP" server and containing a protocol address associated with the network element,
  read, from the host configuration data, information enabling the network element to get aware of assistance information assisting the network element to produce timing information based on one or more satellite signals transmitted by one or more satellites of a satellite system, and
  obtain the assistance information in accordance with the information read from the host configuration data.

In accordance with the invention, there is provided also a new computer program product. The computer program product comprises a computer readable medium, e.g. an optical disc, encoded with a computer program according to the invention.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

Exemplifying and non-limiting embodiments of the invention and their advantages are explained in greater detail below in the sense of examples and with reference to the accompanying drawings, in which.

DESCRIPTION OF EXEMPLIFYING EMBODIMENTS

The specific examples provided in the description below should not be construed as limiting the scope and/or the applicability of the accompanied claims. Lists and groups of examples provided in the description are not exhaustive unless otherwise explicitly stated.

Figure 1:
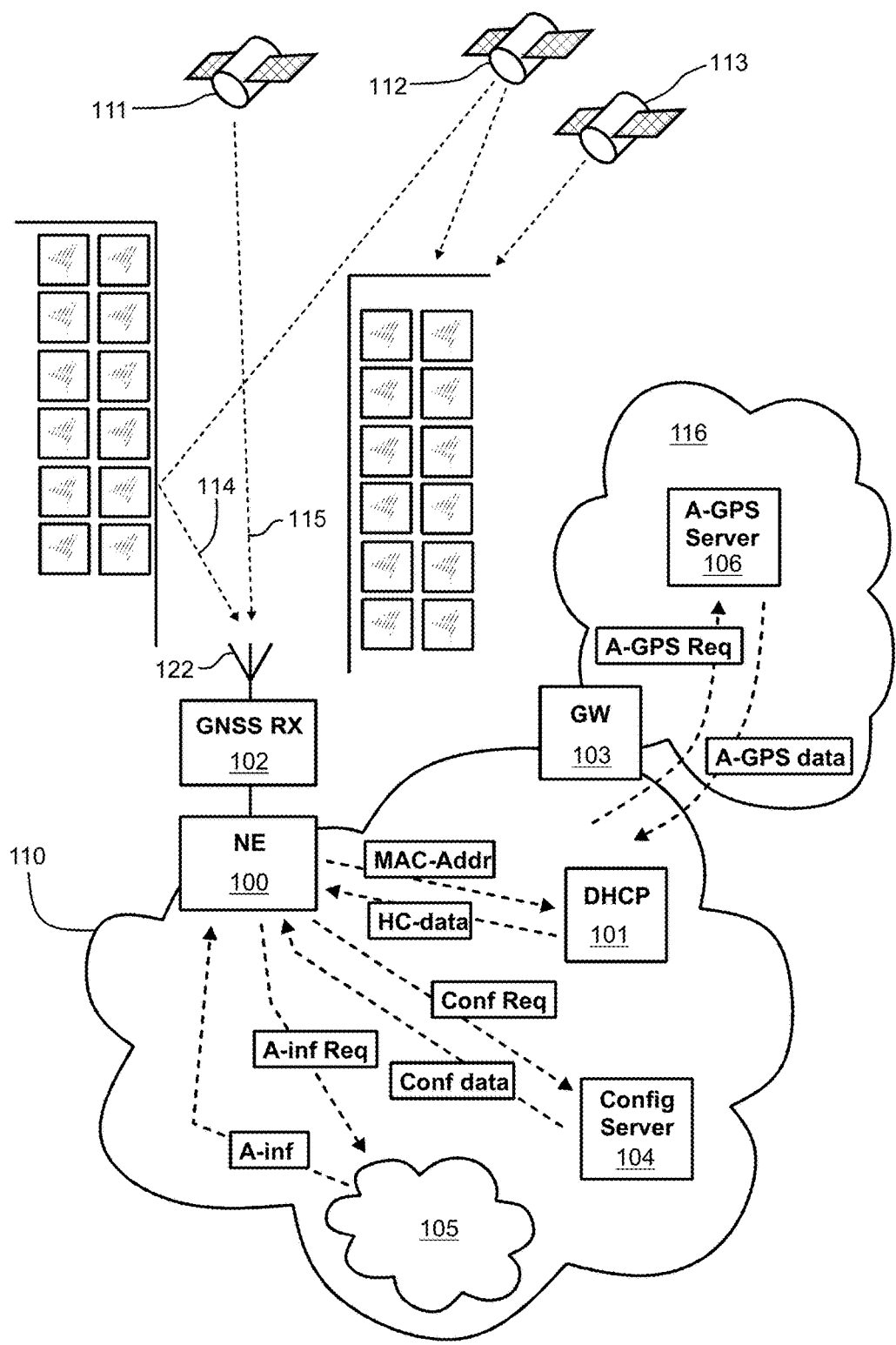
FIG. 1 illustrates a data transfer network comprising a network element according to an exemplifying and non-limiting embodiment of the invention and a dynamic host configuration protocol "DHCP" server according to an exemplifying and non-limiting embodiment of the invention.

FIG. 1 illustrates a data transfer network 110 that comprises a network element 100 according to an exemplifying and non-limiting embodiment of the invention. The data transfer network 110 comprises also a dynamic host configuration protocol "DHCP" server 101 according to an exemplifying and non-limiting embodiment of the invention. The network element 100 is arranged to receive one or more satellite signals transmitted by one or more satellites of a satellite system. In the exemplifying case shown in FIG. 1, the network element 100 is connected to a Global Navigation Satellite System "GNSS" receiver 102 that comprises one or more antennas and circuitries for receiving the one or more satellite signals. It is also possible that the network element 100 comprises the GNSS-receiver 102 as an integral part of the network element. In the exemplifying situation shown in FIG. 1, the antenna of the GNSS-receiver 102 is located in an urban canyon and the GNSS receiver receives a satellite signal 115 directly from a satellite 111 and a reflected satellite signal 114 from a satellite 112. As the antenna of the GNSS-receiver 102 is located in the urban canyon, the GNSS-receiver 102 is not capable of receiving a satellite signal transmitted by a satellite 113.

After the network element 100 has been physically installed on its site and connected to a power supply, the network element 100 requests the DHCP-server 101 to send host configuration "HC" data to the network element 100. The HC-data contains data for enabling the network element 100 to operate as a part of the data transfer network 110. The HC-data may contain, among others, a protocol address to be associated with the network element 100, a protocol address of a gateway 103 providing access to an external network 116, and/or a protocol address of a configuration server 104 that sends a configuration data set 'Conf data' to the network element 100 in response to receiving a configuration request 'Conf Req' from the network element 100. The configuration data set can be e.g. a configuration file that is transferred with the file transfer protocol "FTP". The above-mentioned protocol addresses can be for example Internet Protocol "IP" addresses. The HC-data can be requested for example so that the network element 100 broadcasts or multicasts, in the data transfer network 110, the Media Access Control "MAC" address of the network element 100 together with a request for the protocol address.

The network element 100 is adapted to read, from the above-mentioned HC-data, information that enables the network element to get aware of assistance information which assists the network element 100 to produce timing information based on the received satellite signals 114 and 115. After the above-mentioned information has been read from the HC-data, the network element 100 obtains the assistance information in accordance with the read information. The assistance information may comprise for example at least a part of the Assisted-GPS "A-GPS" data such as almanac data indicative of the status of the satellite constellation of the satellite system and/or ephemeris data indicative of orbital information related to one or more satellites of the satellite system. Furthermore, the assistance information may comprise position data which expresses the geographical position of an antenna 122 for receiving the satellite signals 114 and 115. It is also possible that the assistance information is nothing more than the position data.

The network element 100 is adapted to produce timing information based on the received satellite signals 114 and 115 and on the above-mentioned assistance information. The timing information may comprise for example a Time-of-Day "ToD" value and/or a periodic signal expressing a reference frequency and/or a reference phase. The periodic signal can be for example a pulse-per-second signal "PPS". The network element 100 is adapted to transmit the timing information to the data transfer network 110 in accordance with a timing transfer protocol used in the data transfer network 110. In cases where the timing information has sufficient quality, the network element 100 is capable of acting as a Grand Master Clock "GMC" source in the data transfer network 110. In cases where the quality of the timing information fulfills the requirements of the Primary Reference Timing Clock "PRTC" defined by the International Telecommunication Union "ITU", the network element 100 is capable of acting as a PRTC-source in the data transfer network 110. The above-mentioned timing transfer protocol can be for example the IEEE 1588 timing transfer protocol that suitable for packet switched data transfer networks. The "IEEE" is the abbreviation for the Institute of Electrical and Electronics Engineers.

There are many different ways to enable the network element 100 to get aware of the assistance information. Some exemplifying ways are described below with reference to FIG. 1. It is to be noted that the below-presented exemplifying ways do not constitute an exhaustive set of examples.

In a data transfer network according to an exemplifying and non-limiting embodiment of the invention, the DHCP-server 101 includes the assistance information into the HC-data and the network element 100 reads the assistance information from the HC-data. In this exemplifying case, the DHCP-server 101 may retrieve assistance data from a satellite system assistance server 106. In FIG. 1, a message 'A-GPS Req' is a request for the assistance data. The satellite system assistance server 106 can be for example an A-GPS server and the assistance data can be for example the Assisted-GPS data 'A-GPS data' that can be downloaded from the A-GPS server with the aid of the A-GPS protocols. The DHCP-server 101 may include the whole assistance data into the HC-data, or the DHCP-server 101 may include, into the HC-data, only a part of the assistance data which is relevant to the network element 100. The relevant part of the assistance data can be determined on the basis of for example the geographical position of the antenna 122 and/or time when the part of the assistance data will be utilized by the network element 100. Furthermore, the DHCP-server 101 may include, into the HC-data, position data indicative of the geographical position of the antenna 122. It is also possible that the assistance information contained by the HC-data is nothing more than the position data.

In a data transfer network according to another exemplifying and non-limiting embodiment of the invention, the DHCP-server 101 includes, into the HC-data, a protocol address of a part 105 of the data transfer network 110 from which the assistance information is retrievable. The network element 100 reads the protocol address from the HC-data, and then the network element 100 sends a request for the assistance information 'A-inf Req' to the part 105 of the data transfer network 110. Thereafter, the network element 100 receives the assistance information 'A-inf' from the part 105 of the data transfer network 110. The part 105 of the data transfer network 110 can be a single network element, e.g. a single server device, or an entity constituted by many interconnected network elements. A network element of the part 105 of the data transfer network 110 may retrieve the assistance data e.g. the 'A-GPS data' from the satellite system assistance server 106 e.g. the A-GPS server. The whole assistance data can be included into the assistance information 'A-inf', or only a relevant part of the assistance data can be included into the assistance information 'A-inf'. The relevant part of the assistance data can be determined on the basis of for example the geographical position of the antenna 122 and/or time when the part of the assistance data will be utilized by the network element 100. Furthermore, position data indicative of the geographical position of the antenna 122 can be included into the assistance information 'A-inf'. It is also possible that the assistance information 'A-inf' is nothing more than the position data.

In a data transfer network according to an exemplifying and non-limiting embodiment of the invention, the configuration data set 'Conf data' transmitted by the configuration server 104 to the network element 100 contains the protocol address of the part 105 of the data transfer network 110 from which the assistance information 'A-inf' is retrievable.

The data transfer network 110 may comprise many GNSS-devices similar to the GNSS-device constituted by the GNSS-receiver 102 and the network element 100. These GNSS-devices do not need to support communication protocols such as the A-GPS protocols for retrieving the assistance data from the satellite system assistance server 106 because, as described above, the relevant assistance information is arranged to be available in the data transfer network 110. Thus, the GNSS-devices can be more simple and cost effective than in cases where each GNSS-device has to communicate with a satellite system assistance server such as the A-GPS server.

Figure 2:
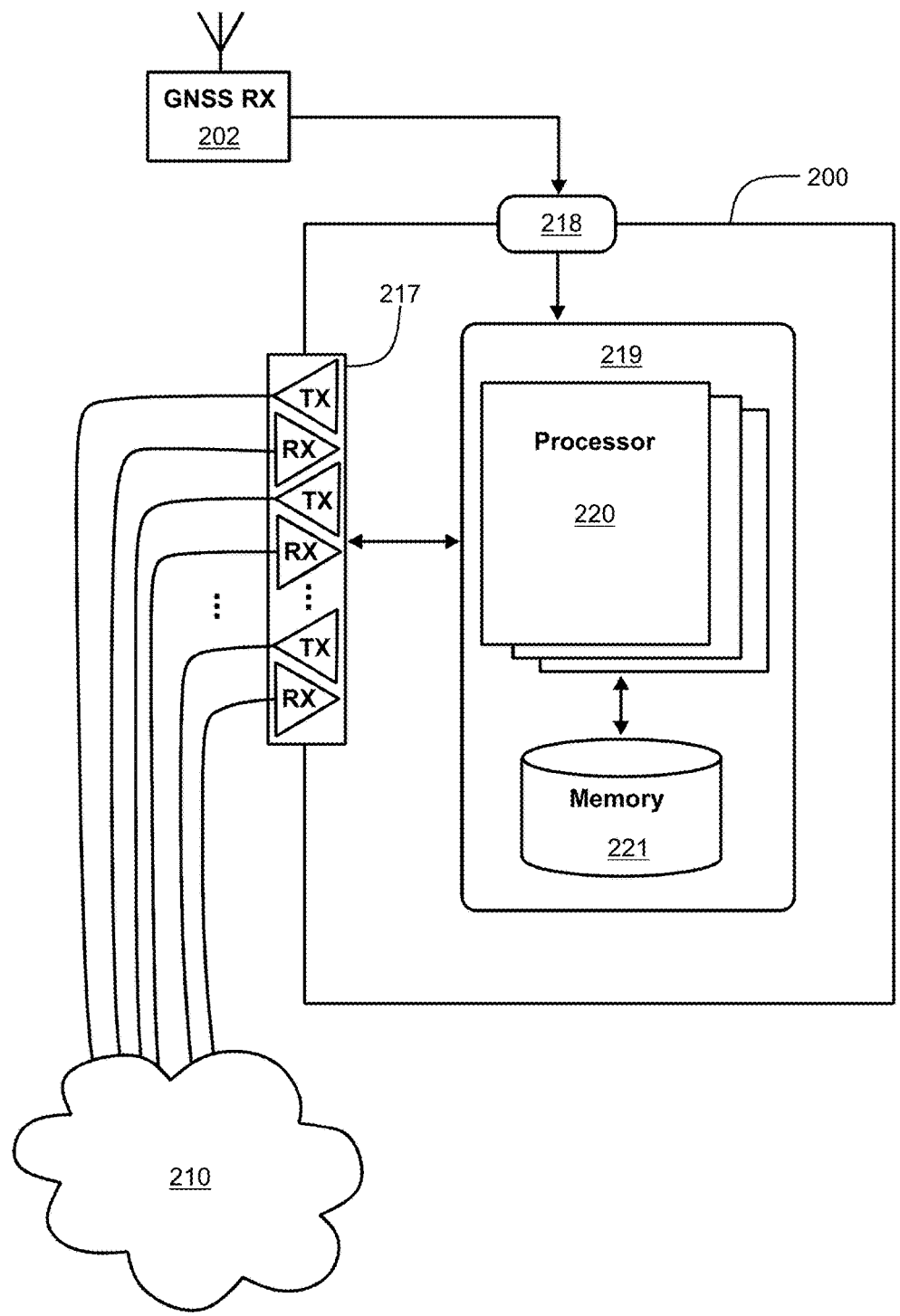
FIG. 2 illustrates a network element according to an exemplifying and non-limiting embodiment of the invention.

FIG. 2 illustrates a network element 200 according to an exemplifying and non-limiting embodiment of the invention. The network element comprises a data interface 217 for connecting to a data transfer network 210 via data transfer links. The data interface 217 may comprise electric transmitters "TX" and receivers "RX" for connecting to electric data transfer links, and/or optical transmitters and receivers for connecting to optical data transfer links, and/or radio transmitters and radio receivers for implementing radio links. The network element 200 comprises a signal interface 218 for receiving one or more satellite signals transmitted by a satellite system, e.g. a GNSS. In the exemplifying case illustrated in FIG. 2, the network element 200 receives the one or more satellite signals from an external satellite receiver 202. It is also possible that the satellite receiver 202 is a part of the network element in which case the signal interface 218 is an internal signal interface of the network element.

The network element 200 comprises a processing system 219 that is adapted to control the network element 200 to request a dynamic host configuration protocol "DHCP" server of the data transfer network 210 to send host configuration "HC" data containing, among others, a protocol address to be associated with the network element 200. The processing system 219 is adapted to read, from the HC-data, information enabling the network element 200 to get aware of assistance information that assists the network element 200 to produce timing information based on the above-mentioned one or more satellite signals. The processing system 219 is adapted to obtain the assistance information in accordance with the information read from the HC-data. The processing system 219 is adapted to produce timing information based on the one or more satellite signals and on the assistance information, and to control the network element 200 to transmit the timing information to the data transfer network 210 in accordance with a timing transfer protocol, e.g. the IEEE 1588, used in the data transfer network 210.

In a network element according to an exemplifying and non-limiting embodiment of the invention, the processing system 219 is adapted to read the assistance information from the HC-data.

In a network element according to an exemplifying and non-limiting embodiment of the invention, the processing system 219 is adapted to read, from the above-mentioned HC-data, a protocol address of a part of the data transfer network 210 from which the above-mentioned assistance information is retrievable. The processing system 219 is adapted to control the network element to transmit, to the part of the data transfer network 210, a request for the assistance information.

In a network element according to an exemplifying and non-limiting embodiment of the invention, the processing system 219 is adapted to read, from the above-mentioned HC-data, a protocol address of a configuration server of the data transfer network 210. The processing system 219 is adapted to control the network element to transmit, to the configuration server, a request for a configuration data set. The processing system 219 is adapted to read, from the configuration data set, a protocol address of a part of the data transfer network 210 from which the above-mentioned assistance information is retrievable, and control the network element to transmit, to the part of the data transfer network 210, a request for the assistance information.

In a network element according to an exemplifying and non-limiting embodiment of the invention, the processing system 219 is adapted to extract, from the assistance information, position data indicative of the geographical position of an antenna for receiving the one or more satellite signals and to utilize the position data when producing the timing information based on the one or more satellite signals.

In a network element according to an exemplifying and non-limiting embodiment of the invention, the processing system 219 is adapted to extract, from the assistance information, almanac data indicative of status of a satellite constellation of the satellite system and to utilize the almanac data when producing the timing information based on the one or more satellite signals.

In a network element according to an exemplifying and non-limiting embodiment of the invention, the processing system 219 is adapted to extract, from the assistance information, ephemeris data indicative of orbital information of one or more satellites of the satellite system and to utilize the ephemeris data when producing the timing information based on the one or more satellite signals.

In a network element according to an exemplifying and non-limiting embodiment of the invention, the processing system 219 is adapted to repeatedly obtain the assistance information in accordance with the information read from the HC-data.

The processing system 219 which is schematically illustrated in FIG. 2 may comprise one or more processor circuits 220 each of which can be a programmable processor circuit provided with appropriate software, a dedicated hardware processor such as for example an application specific integrated circuit "ASIC", or a configurable hardware processor such as for example a field programmable gate array "FPGA". The processing system 219 may further comprise a memory 221 which may comprise one or more memory circuits such as e.g. random access memory "RAM" circuits.

The network element 200 described above with reference to FIG. 2 can be deemed to be a network element that comprises:
means for receiving, from a dynamic host configuration protocol "DHCP" server, host configuration "HC" data containing a protocol address to be associated with the network element,
means for reading, from the HC-data, information enabling the network element to get aware of assistance information assisting the network element to produce timing information based on one or more satellite signals transmitted by one or more satellites of a satellite system,
means for obtaining the assistance information in accordance with the information read from the HC-data,
means for producing the timing information based on the one or more satellite signals and on the assistance information, and
means for transmitting the timing information to a data transfer network in accordance with a timing transfer protocol used in the data transfer network.

Figure 3:
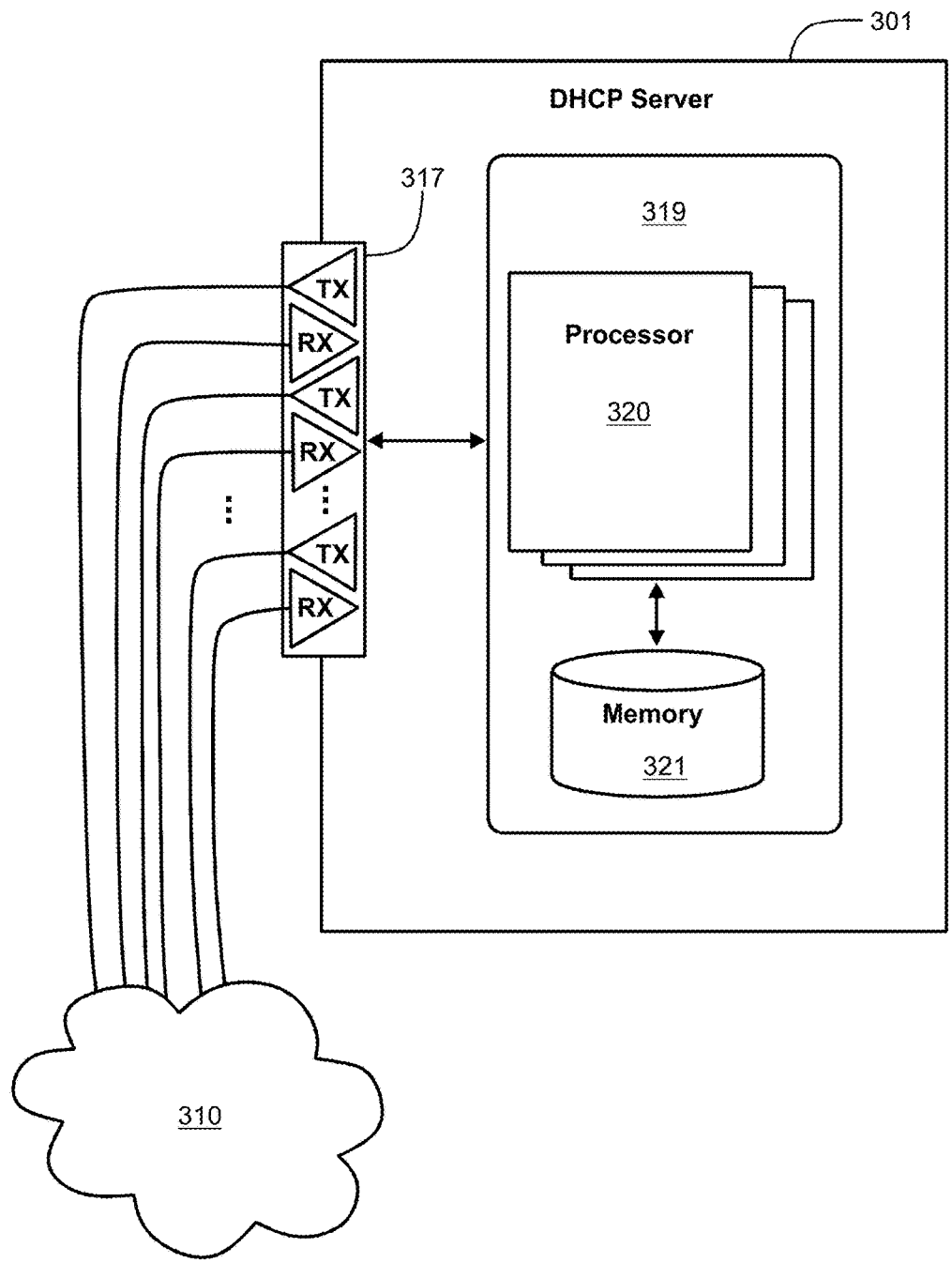
FIG. 3 illustrates a dynamic host configuration protocol "DHCP" server according to an exemplifying and non-limiting embodiment of the invention.

FIG. 3 illustrates a dynamic host configuration protocol "DHCP" server 301 according to an exemplifying and non-limiting embodiment of the invention. The DHCP-server 301 comprises a data interface 317 for connecting to a data transfer network 310 via data transfer links. The data interface 317 may comprise electric transmitters "TX" and receivers "RX" for connecting to electric data transfer links, and/or optical transmitters and receivers for connecting to optical data transfer links, and/or radio transmitters and radio receivers for implementing radio links. The DHCP-server 301 comprises a processing system 319 adapted to allocate a protocol address for a network element of the data transfer network 310 in response to receiving a request from the network element. The processing system 319 is adapted to compose host configuration "HC" data that contains, among others, the allocated protocol address. The processing system 319 is adapted to provide the HC-data with information that enables the network element to get aware of assistance information that assists the network element to produce timing information based on one or more satellite signals transmitted by a satellite system. The processing system 319 is adapted to control the DHCP-server 301 to transmit the HC-data to the network element.

In a DHCP-server according to an exemplifying and non-limiting embodiment of the invention, the processing system 319 is adapted provide the HC-data with the above-mentioned assistance information so as to enable the network element to read the assistance information from the HC-data. In this exemplifying case, the processing system 319 can be adapted to transmit a request for assistance data to a satellite system assistance server that is accessible via the data transfer network 310. The assistance data can be e.g. the A-GPS data and the satellite system assistance server can be e.g. the A-GPS server. The processing system 319 is adapted to provide the HC-data with at least a part of the assistance data received from the satellite system assistance server. In this exemplifying case, the assistance information comprises the at least part of the assistance data. Furthermore, the assistance information may comprise position data indicative of the geographical position of an antenna for receiving the one or more satellite signals. It is also possible that the assistance information contained by the HC-data is nothing more than the position data.

In a DHCP-server according to an exemplifying and non-limiting embodiment of the invention, the processing system 319 is adapted to separate, from the above-mentioned assistance data, a part of the assistance data that is relevant to the network element so that the rest of the assistance data is irrelevant to the network element. In this exemplifying case, the assistance information comprises the relevant part of the assistance data.

In a DHCP-server according to an exemplifying and non-limiting embodiment of the invention, the processing system 319 is adapted to provide the HC-data with information enabling the network element to get aware of a part of the data transfer network 310 from which the assistance information is retrievable. For example, a protocol address such as an IP-address of the part of the data transfer network 310 can be included into the HC-data.

The processing system 319 which is schematically illustrated in FIG. 3 may comprise one or more processor circuits 320 each of which can be a programmable processor circuit provided with appropriate software, a dedicated hardware processor such as for example an application specific integrated circuit "ASIC", or a configurable hardware processor such as for example a field programmable gate array "FPGA". The processing system 319 may further comprise a memory 321 which may comprise one or more memory circuits such as e.g. random access memory "RAM" circuits.

The DHCP-server 301 described above with reference to FIG. 3 can be deemed to be a DHCP-server that comprises:
- means for receiving a request from a network element of a data transfer network,
- means for allocating, in response to receiving the request, a protocol address to be associated with the network element,
- means for composing host configuration "HC" data containing the protocol address and for providing the HC-data with information enabling the network element to get aware of assistance information assisting the network element to produce timing information based on one or more satellite signals transmitted by a satellite system, and
- means for transmitting the HC-data to the network element.

Figure 4:
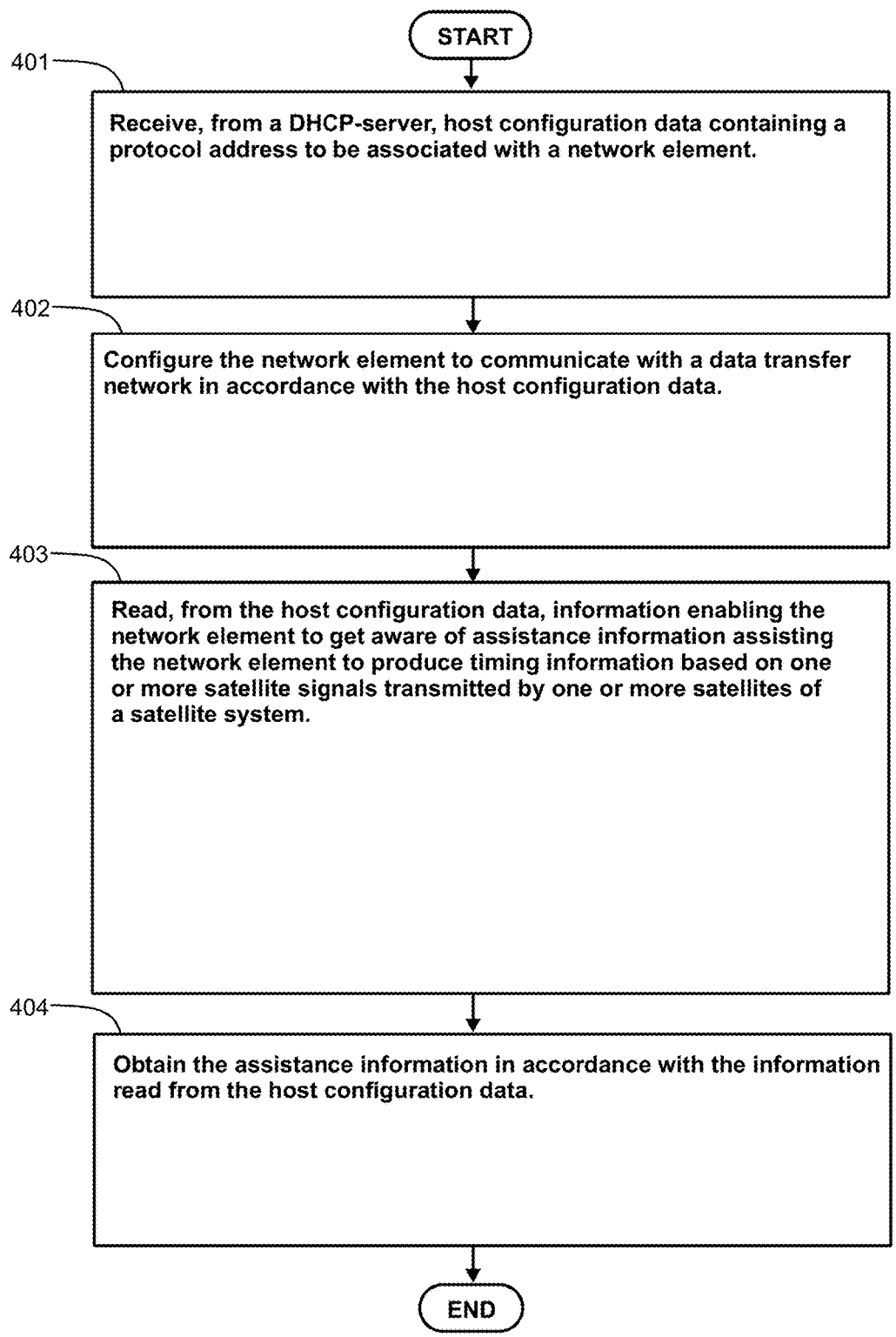
FIG. 4 shows a flowchart of a method according to an exemplifying and non-limiting embodiment of the invention for configuring a network element to operate as a timing source.

FIG. 4 shows a flowchart of a method according to an exemplifying and non-limiting embodiment of the invention for configuring a network element to operate as a timing source. The method comprises the following actions:
- action 401: receiving, from a dynamic host configuration protocol "DHCP" server, host configuration "HC" data containing a protocol address to be associated with the network element,
- action 402: configuring the network element to communicate with a data transfer network in accordance with the HC-data,
- action 403: reading, from the HC-data, information enabling the network element to get aware of assistance information assisting the network element to produce timing information based on one or more satellite signals transmitted by one or more satellites of a satellite system, and
- action 404: obtaining the assistance information in accordance with the information read from the HC-data.

In a method according to an exemplifying and non-limiting embodiment of the invention, the assistance information is obtained repeatedly in accordance with the information read from the HC-data.

A method according to an exemplifying and non-limiting embodiment of the invention comprises reading the assistance information from the HC-data.

A method according to an exemplifying and non-limiting embodiment of the invention comprises:
- reading, from the HC-data, a protocol address of a part of the data transfer network from which the assistance information is retrievable, and
- transmitting, to the part of the data transfer network, a request for the assistance information.

A method according to an exemplifying and non-limiting embodiment of the invention comprises:
- reading, from the HC-data, a protocol address of a configuration server of the data transfer network,
- transmitting, to the configuration server, a request for a configuration data set,
- reading, from the configuration data set, a protocol address of a part of the data transfer network from which the assistance information is retrievable, and
- transmitting, to the part of the data transfer network, a request for the assistance information.

A method according to an exemplifying and non-limiting embodiment of the invention comprises extracting, from the assistance information, position data indicative of the geographical position of an antenna receiving the one or more satellite signals and utilizing the position data when producing the timing information based on the one or more satellite signals.

A method according to an exemplifying and non-limiting embodiment of the invention comprises extracting, from the assistance information, almanac data indicative of status of a satellite constellation of the satellite system and utilizing the almanac data when producing the timing information based on the one or more satellite signals.

A method according to an exemplifying and non-limiting embodiment of the invention comprises extracting, from the assistance information, ephemeris data indicative of orbital information of one or more satellites of the satellite system and utilizing the ephemeris data when producing the timing information based on the one or more satellite signals.

A computer program according to an exemplifying and non-limiting embodiment of the invention comprises computer executable instructions for controlling a programmable processing system to carry out actions related to a method according to any of the above-described exemplifying and non-limiting embodiments of the invention.

A computer program according to an exemplifying and non-limiting embodiment of the invention comprises software modules for configuring a network element to operate as a timing source. The software modules comprise computer executable instructions for controlling a programmable processing system of the network element to:
configure the network element to communicate with a data transfer network in accordance with host configuration "HC" data received from a dynamic host configuration protocol "DHCP" server and containing a protocol address associated with the network element,
read, from the HC-data, information enabling the network element to get aware of assistance information assisting the network element to produce timing information based on one or more satellite signals transmitted by one or more satellites of a satellite system, and
obtain the assistance information in accordance with the information read from the HC-data.

The software modules can be for example subroutines or functions implemented with programming tools suitable for the programmable processing system.

A computer program product according to an exemplifying and non-limiting embodiment of the invention comprises a computer readable medium, e.g. an optical disc, encoded with a computer program according to an exemplifying embodiment of invention.

A non-transitory computer readable medium, e.g. an optical disc, according to an exemplifying and non-limiting embodiment of the invention is encoded with a computer program according to an exemplifying embodiment of invention.

A signal according to an exemplifying and non-limiting embodiment of the invention is encoded to carry information defining a computer program according to an exemplifying embodiment of invention.

The specific examples provided in the description given above should not be construed as limiting the scope and/or the applicability of the appended claims. Lists and groups of examples provided in the description given above are not exhaustive unless otherwise explicitly stated.

What is claimed is:
1. A network element comprising:
a data interface system configured to connect to a data transfer network;
a signal interface receiver configured to receive one or more satellite signals transmitted by a satellite system that is a Global Navigation Satellite System; and
a processing system comprising one or more processor circuits configured to:
produce timing information based on the one or more satellite signals and on assistance information received from the data transfer network, the assistance information being based on A-GPS assistance data,
control the network element to request a dynamic host configuration protocol server of the data transfer network to send host configuration data containing a protocol address to be associated with the network element,
control the network element to transmit the timing information to the data transfer network in accordance with a timing transfer protocol used in the data transfer network, the network element operating as a timing source based on the one or more satellite signals and on the assistance information, and
read, from the host configuration data, information enabling the network element to get aware of the assistance information, and to obtain the assistance information in accordance with the information read from the host configuration data.

2. The network element according to claim 1, wherein the one or more processors circuit is configured to read the assistance information from the host configuration data.

3. The network element according to claim 1, wherein the one or more processors circuit is configured to:
read, from the host configuration data, a protocol address of a part of the data transfer network from which the assistance information is retrievable, and
control the network element to transmit, to the part of the data transfer network, a request for the assistance information.

4. The network element according to claim 1, wherein the one or more processors circuit is configured to:
read, from the host configuration data, a protocol address of a configuration server of the data transfer network,
control the network element to transmit, to the configuration server, a request for a configuration data set,
read, from the configuration data set, a protocol address of a part of the data transfer network from which the assistance information is retrievable, and
control the network element to transmit, to the part of the data transfer network, a request for the assistance information.

5. The network element according to claim 1, wherein the one or more processors circuit is configured to extract, from the assistance information, position data indicative of geographical position of an antenna for receiving the one or more satellite signals and to utilize the position data when producing the timing information based on the one or more satellite signals.

6. The network element according to claim 1, wherein the one or more processors circuit is configured to extract, from the assistance information, almanac data indicative of status of a satellite constellation of the satellite system and to utilize the almanac data when producing the timing information based on the one or more satellite signals.

7. The network element according to claim 1, wherein the one or more processors circuit is configured to extract, from the assistance information, ephemeris data indicative of orbital information of one or more satellites of the satellite system and to utilize the ephemeris data when producing the timing information based on the one or more satellite signals.

8. The network element according to claim 1, wherein the one or more processors circuit is configured to repeatedly obtain the assistance information in accordance with the information read from the host configuration data.

9. A dynamic host configuration protocol server comprising:
a data interface system configured to connect to a data transfer network; and
a processing system comprising one or more processor circuits configured to:
allocate, in response to receiving a request from a network element of the data transfer network, a protocol address to be associated with the network element,
control the dynamic host configuration protocol server to transmit, to the network element, host configuration data containing the allocated protocol address, and
provide the host configuration data with information enabling the network element to get aware of assistance information assisting the network element to produce timing information based on one or more satellite signals transmitted by a satellite system,
wherein the timing information enables the network element to operate as a timing source, the satellite system is a Global Navigation Satellite System, and the assistance information is based on A-GPS assistance data.

10. The dynamic host configuration protocol server according to claim 9, wherein the one or more processors circuit is configured to:
transmit a request for assistance data to a satellite system assistance server accessible via the data transfer network, and
provide the host configuration data with at least a part of the assistance data received from the satellite system assistance server, the assistance information comprising the at least part of the assistance data.

11. The dynamic host configuration protocol server according to claim 10, wherein the one or more processors circuit is configured to separate, from the assistance data, the part of the assistance data so that the separated part is used by the network element when producing the timing information and rest of the assistance data is useless to the network element when producing the timing information.

12. The dynamic host configuration protocol server according to claim 9, wherein the one or more processors circuit is configured to provide the assistance information with position data indicative of geographical position of an antenna configured to receive the one or more satellite signals.

13. The dynamic host configuration protocol server according to claim 9, wherein the one or more processors circuit is configured to provide the host configuration data with information enabling the network element to get aware of a part of the data transfer network from which the assistance information is retrievable.

14. A method for configuring a network element, the method comprising:
receiving, from a dynamic host configuration protocol server, host configuration data containing a protocol address to be associated with the network element;
configuring the network element to communicate with a data transfer network in accordance with the host configuration data;
reading, from the host configuration data, information enabling the network element to get aware of assistance information assisting the network element to produce timing information based on one or more satellite signals transmitted by one or more satellites of a satellite system; and
obtaining the assistance information in accordance with the information read from the host configuration data,
wherein the timing information enables the network element to operate as a timing source, the satellite system is a Global Navigation Satellite System, and the assistance information is based on A-GPS assistance data.

15. A non-transitory computer readable medium encoded with a computer program for configuring a network element, the computer program comprising computer executable instructions for controlling a programmable processing system of the network element to:
configure the network element to communicate with a data transfer network in accordance with host configuration data received from a dynamic host configuration protocol server and containing a protocol address associated with the network element;
read, from the host configuration data, information enabling the network element to get aware of assistance information assisting the network element to produce timing information based on one or more satellite signals transmitted by one or more satellites of a satellite system; and
obtain the assistance information in accordance with the information read from the host configuration data,
wherein the timing information enables the network element to operate as a timing source, the satellite system is a Global Navigation Satellite System, and the assistance information is based on A-GPS assistance data.

16. The network element according to claim 2, wherein the one or more processors circuit is configured to repeatedly obtain the assistance information in accordance with the information read from the host configuration data.

17. The network element according to claim 3, wherein the one or more processors circuit is configured to repeatedly obtain the assistance information in accordance with the information read from the host configuration data.

18. The network element according to claim 4, wherein the one or more processors circuit is configured to repeatedly obtain the assistance information in accordance with the information read from the host configuration data.

19. The network element according to claim 5, wherein the one or more processors circuit is configured to repeatedly obtain the assistance information in accordance with the information read from the host configuration data.

20. The network element according to claim 6, wherein the one or more processors circuit is configured to repeatedly obtain the assistance information in accordance with the information read from the host configuration data.

* * * * *